Aug. 20, 1929.   R. WEDEBERG   1,725,234
LUBRICANT NOZZLE
Filed Sept. 7, 1926
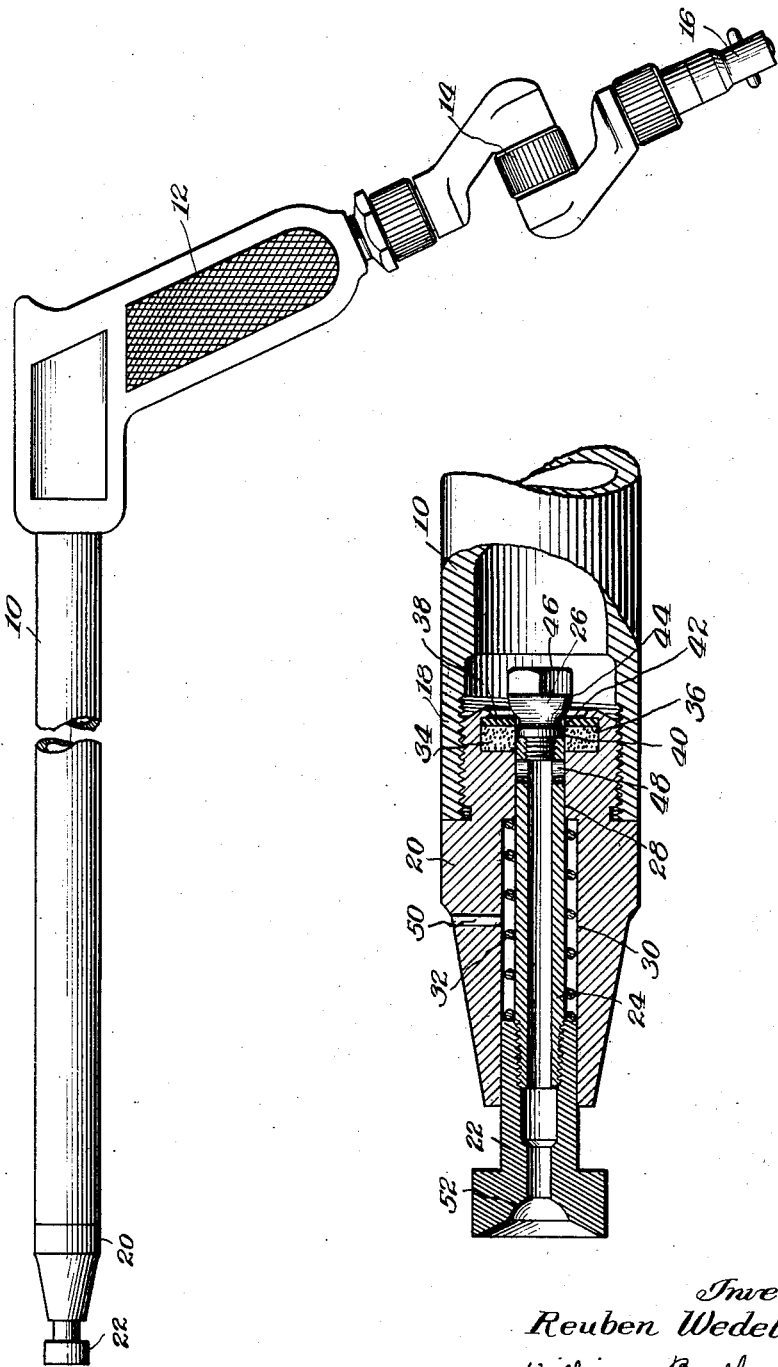
Inventor
Reuben Wedeberg
Williams, Bradbury,
By McCaleb & Kiehle
Attys.

Patented Aug. 20, 1929.

1,725,234

UNITED STATES PATENT OFFICE.

REUBEN WEDEBERG, OF CHICAGO, ILLINOIS, ASSIGNOR TO ALEMITE CORPORATION, OF CHICAGO, ILLINOIS, A CORPORATION OF DELAWARE.

LUBRICANT NOZZLE.

Application filed September 7, 1926. Serial No. 134,003.

My invention relates to lubrication and more specifically to an improved nozzle mechanism for the convenient injection of lubricant under pressure in either small or large quantities into a plurality of lubricant-receiving devices carried by the mechanism to be lubricated.

Among the objects and advantages of the invention may be enumerated:

First, to increase the durability of the valve mechanism for such a nozzle; and

Second, to improve the sealing action of the valve means in both open and closed positions.

Further objects and advantages of the invention will become apparent as the description proceeds.

In the accompanying drawings,

Figure 1 is a side elevation of a complete nozzle; and

Figure 2 is an enlarged section through the discharge end of said nozzle.

In the embodiment of the invention selected for illustration, the nozzle as a whole comprises a main tube 10 mounted on a pistol handle 12 forming the continuation of the lubricant-delivery conduit, for convenient manual use of the nozzle. A double swivel indicated as a whole by the reference character 14, and ending in suitable coupling means at 16, affords the operator freedom in manipulating the nozzle into any desired position.

Referring now to Figure 2, the tube 10 is threaded at 18 to receive the head 20. The head 20 has an axial bore receiving a telescopically slidable extension made up of the contact terminal 22, the intermediate tube 24, and the valve head 26. The bore in the head 20 has a relatively small portion 28 fitting the tube 24 and a larger portion 30 slidably receiving the terminal 22. The annular chamber thus defined houses the compression spring 32 which normally holds the extension in the position of Figure 2. Back of the small portion 28 the bore is enlarged to form a cup receiving an annular sealing member 34 of cork, leather or the like, surmounted by a thrust washer 36, the whole being held in place against complete removal from the cup by a bead 38, spun or otherwise bent in over the outer edge of the washer 36. The head 26 is threaded into the adjacent end of the tube 24 with a shoulder 40 to abut the end of the tube. Back of the shoulder it is constructed to form a neck 42 and then flares outwardly at 44 to form the valve head proper. At its inner end it may be squared as at 46 for convenience in assembly. The tube 24 is provided with two lateral apertures 48 to admit lubricant when the extension is pushed in far enough to move the apertures back of the sealing member 34 and washer 36. The chamber housing the spring 32 is vented by a passageway 50 extending outwardly through the head 20.

The terminal member 22 may comprise any suitable or preferred means for effecting a sealed connection with a lubricant-receiving device in such a way as to be capable of receiving the thrust necessary to slide the head 20 toward the lubricant-receiving device and open the valve to inject lubricant. I have illustrated a terminal having a cup shaped portion 52 of spherical shape adapted to form a metal to metal contact seal with a circular edge on a lubricant-receiving device.

When the parts are in the position of Figure 2, the flow of lubricant out of the tube 10 is opposed; first, by the metal to metal seal between the valve head proper 44 and the washer 36; and second, by the peripheral seal between the sealing annulus 34 and the walls of the tube 24. In the position of Figure 2, this annulus carries the thrust of the compression spring 32 and also the hydraulic pressure of the lubricant, so that it will tend to bulge in and grip the wall tightly. Lastly, any lubricant that might find its way past these two obstructions arranged in series would enter the aperture 48 and be prevented by the sliding seal between the bore 28 and the tube walls in front of the apertures, from finding its way into the chamber housing the spring 32.

When the parts have been telescoped far enough to carry the apertures 48 past the washer 36, and lubricant is being injected, leakage of lubricant out of the discharge conduit comprising the tubes 10 and 24 is prevented; first, by the seal between the annulus 34 and the outer wall of the tube 24, and second, by the sliding seal with all the bore 28. In the open position, the annulus 34 will still carry some of the hydraulic pressure of the lubricant in the tube 10 and will be squeezed against the wall of the tube 24, although less forcibly than when the valve is closed.

The head 20 and extension carried thereby constitute a compact and complete unitary assembly capable of being removed as such from the tube 10 for repair or replacement.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:

1. A lubricant nozzle comprising a delivery conduit, a tubular extension telescopically mounted in the discharge end of said conduit, a packing mounted in said conduit and having sealing engagement with the outer surface of said extension, a metal washer mounted adjacent said packing to maintain it in position, means carried by said extension for forming a metal to metal contact closure with the metal washer on the high pressure side of said packing, said packing receiving the force of said contact to compress said packing, said extension having lateral ports movable axially past said packing, said conduit and extension having spaced annular shoulders defining a spring chamber, and a spring in said chamber, said conduit having a vent leading from said chamber outwardly.

2. A lubricant nozzle comprising a delivery conduit, a tubular extension telescopically mounted in the discharge end of said conduit, a packing mounted in said conduit and having sealing engagement with the outer surface of said extension, a metal washer mounted adjacent said packing to maintain it in position, and means carried by said extension for forming a metal to metal contact closure with the metal washer on the high pressure side of said packing, said packing receiving the force of said contact to compress said packing.

3. A lubricant nozzle comprising a delivery conduit, a tubular extension telescopically mounted in the discharge end of said conduit, a packing mounted in said conduit and having sealing engagement with the outer surface of said extension, a metal washer mounted adjacent said packing to maintain it in position, means carried by said extension for forming a metal to metal contact closure with the metal washer on the high pressure side of said packing, said packing receiving the force of said contact to compress said packing, said extension having lateral ports movable axially past said packing.

4. A lubricant nozzle comprising a delivery conduit, a tubular extension telescopically mounted in the discharge end of said conduit, coupling means on the outer end of said extension, a packing mounted in said conduit and having sealing engagement with the outer surface of said extension, means carried by said extension for forming a closure on the high pressure side of said packing, said packing receiving the force of said closure to compress said packing.

5. A lubricant nozzle comprising a delivery conduit, a tubular extension telescopically mounted in the discharge end of said conduit, coupling means carried on said extension, a packing mounted in said conduit and having sealing engagement with the outer surface of said extension, and metal parts carried by said extension and delivery conduit for forming a closure on the high pressure side of said packing, said packing receiving the force of said closure to compress said packing.

6. High pressure lubricating apparatus of the class described, comprising a delivery conduit, a tubular extension telescopically mounted in the discharge end of said conduit, a packing mounted in said conduit and having sealing engagement with the outer surface of said extension, a metal valve seat yieldably supported by said packing, and a valve part carried by said extension and cooperating with said valve seat.

7. In lubricating apparatus of the class described, a lubricant nozzle comprising a delivery conduit, a tubular extension telescopically mounted in the discharge end of said conduit, coupling means connected to said extension, a deformable packing mounted in said conduit and surrounding said extension, a rigid valve part yieldably supported by said packing, and a valve part carried by said tubular extension for cooperating with said first mentioned valve part.

8. A lubricant nozzle comprising a delivery conduit, a movable member mounted in said delivery conduit, a rigid valve seat carried by said delivery conduit, said valve seat having a sharp sealing edge, a deformable member for movably supporting said valve seat, and a conical surface on said movable member for co-acting with said sealing edge.

In witness whereof, I hereunto subscribe my name this 30th day of August, 1926.

REUBEN WEDEBERG.